US009545947B2

(12) United States Patent
Weber

(10) Patent No.: US 9,545,947 B2
(45) Date of Patent: Jan. 17, 2017

(54) OUTPUT STAGE CONTROL IN THE EVENT OF A FAULT

(71) Applicant: ZF Lenksysteme GmbH, Schwaebisch Gmuend (DE)

(72) Inventor: Markus Weber, Goeppingen (DE)

(73) Assignee: Robert Bosch Automotive Steering GmbH, Schwaebisch Gmuend (DE)

( * ) Notice: Subject to any disclaimer, the term of this patent is extended or adjusted under 35 U.S.C. 154(b) by 161 days.

(21) Appl. No.: 14/223,049

(22) Filed: Mar. 24, 2014

(65) Prior Publication Data

US 2014/0309890 A1  Oct. 16, 2014

(30) Foreign Application Priority Data

Apr. 12, 2013  (DE) .................. 10 2013 103 698

(51) Int. Cl.
  *B62D 5/04*  (2006.01)
(52) U.S. Cl.
  CPC ........... *B62D 5/0487* (2013.01); *B62D 5/0481* (2013.01); *B62D 5/0484* (2013.01)
(58) Field of Classification Search
  CPC ............................ B62D 5/0481; B62D 5/0484
  See application file for complete search history.

(56) References Cited

U.S. PATENT DOCUMENTS

| | | | | |
|---|---|---|---|---|
| 5,969,919 A * | 10/1999 | Kobayashi | ........... | B62D 5/0484 318/281 |
| 8,319,460 B2 * | 11/2012 | Son | .......................... | H02P 6/20 318/254.1 |
| 2009/0066286 A1 * | 3/2009 | Gunji | .................... | B62D 5/0487 318/490 |
| 2009/0096394 A1 * | 4/2009 | Taniguchi | ............... | H02M 1/32 318/400.09 |
| 2010/0036555 A1 * | 2/2010 | Hosoda | .................... | B60L 3/003 701/22 |
| 2010/0263953 A1 * | 10/2010 | Shimana | ................. | B60L 7/003 180/65.285 |
| 2011/0074333 A1 * | 3/2011 | Suzuki | ................. | B62D 5/0403 318/724 |
| 2011/0248657 A1 * | 10/2011 | Endoh | .................. | B62D 5/0487 318/400.22 |
| 2011/0273122 A1 * | 11/2011 | Murata | .................... | H02P 29/00 318/400.22 |
| 2012/0326644 A1 * | 12/2012 | Okumura | ............. | B62D 5/0487 318/400.21 |

(Continued)

FOREIGN PATENT DOCUMENTS

DE  10 2006 052 423  12/2007

*Primary Examiner* — Thomas G Black
*Assistant Examiner* — Peter D Nolan
(74) *Attorney, Agent, or Firm* — Jordan and Koda, PLLC

(57) ABSTRACT

A method for implementing a transition from a functioning steering assistance system to a deactivated steering assistance system when a fault occurs, comprising the following steps: establishing the fault of the steering assistance system; establishing that all high-side power switches are functional (first case), or establishing that all low-side power switches are functional (second case); and in the first case: opening all high-side power switches and performing PWM-like control of the low-side power switches; or in the second case: opening all low-side power switches and performing PWM-like control of the high-side power switches.

6 Claims, 4 Drawing Sheets

(56) References Cited

U.S. PATENT DOCUMENTS

2013/0187585 A1* 7/2013 Niemann ................ B60L 3/003
 318/400.21
2013/0277138 A1* 10/2013 Arai ........................ B62D 5/04
 180/443

* cited by examiner

OUTPUT STAGE CONTROL IN THE EVENT OF A FAULT

FIELD OF THE INVENTION

The present invention relates to a method for implementing a transition from a functioning steering assistance system to a deactivated steering assistance system when a fault occurs, and to a steering system comprising a control unit for a vehicle.

BACKGROUND OF THE INVENTION

Power steering systems having an electric driving motor are known from the prior art.

SUMMARY OF THE INVENTION

There can be a variety of reasons which result in the driving motor not being able to supply force for steering assistance. One possibility is that the output stage of the driving motor is defective, and more particularly that a power switch of the output stage is short-circuited.

If there is a defect in the driving motor, or in the control/output stage thereof, the driving motor is disconnected from the output stage so that steering is not blocked by the driving motor. However, such a phase separation results in a sudden increase in the manual torque at the steering wheel of the particular vehicle, whereby the driving comfort is considerably reduced.

Therefore, it is an object is to make a device and a method available which ensure a gradual transition from a low manual torque with a functioning steering assistance system to a higher manual torque upon failure of the steering assistance system when a defect occurs in the driving motor or the output stage thereof.

As a first embodiment of the invention, a method for implementing a transition from a functioning steering assistance system to a deactivated steering assistance system when a fault occurs is made available, comprising the following steps: establishing the fault of the steering assistance system; establishing that all high-side power switches are functional (first case), or establishing that all low-side power switches are functional (second case); and in the first case: opening all high-side power switches and performing PWM-like control of the low-side power switches; or in the second case: opening all low-side power switches and performing PWM-like control of the high-side power switches.

A vehicle may be a passenger car, a truck, an aircraft or watercraft, or an agricultural vehicle, for example.

As a result of switching "off"/deactivating all high-side or all low-side power switches, the power consumption of the driving motor controlled by the particular output stage is limited. In addition, power can dissipate from the driving motor due to the PWM-like control of the remaining power switches. Abrupt deactivation of the steering assistance system is thus prevented, and a gradual transition from a functioning steering assistance system to a deactivated steering assistance system takes place. The manual torque necessary at the steering wheel of the particular vehicle is thus not abruptly increased in the event of a malfunction, and the driving comfort can be ensured even in the event of a fault.

As a second embodiment of the invention, a steering system comprising a control unit for a vehicle is made available, wherein the control unit comprises a memory means having a computer program stored thereon, the computer program being configured to carry out the method.

As a third embodiment of the invention, a computer program for carrying out the method is provided.

As a fourth embodiment of the invention, a computer program product is provided, comprising program code means stored on a computer-readable data medium, so as to carry out the method, if the program code means are executed on a computer.

In one further embodiment according to the invention, a method is made available, wherein, in the first case, not all low-side power switches, and in the second case, not all high-side power switches, are controlled in a PWM-like manner, but in each case one or more power switches are continuously turned on.

An even smoother transition can be achieved by permanently controlling/activating one or more power switches.

It can be considered one idea of the invention to deactivate the high-side or the low-side power switches of the output stage in the event of a fault, and to control the remaining switches permanently or in a PWM-like manner. This results in a gradual deactivation of the steering assistance system, whereby the driving comfort is increased in the event of a fault.

Of course, the individual features can also be combined with each other, whereby advantageous effects may be achieved in some instances, which exceed the sum of the individual effects.

Further details and advantages of the invention will be apparent based on the exemplary embodiments shown in the figures.

DETAILED DESCRIPTION OF THE PREFERRED EMBODIMENTS

Figure 1:
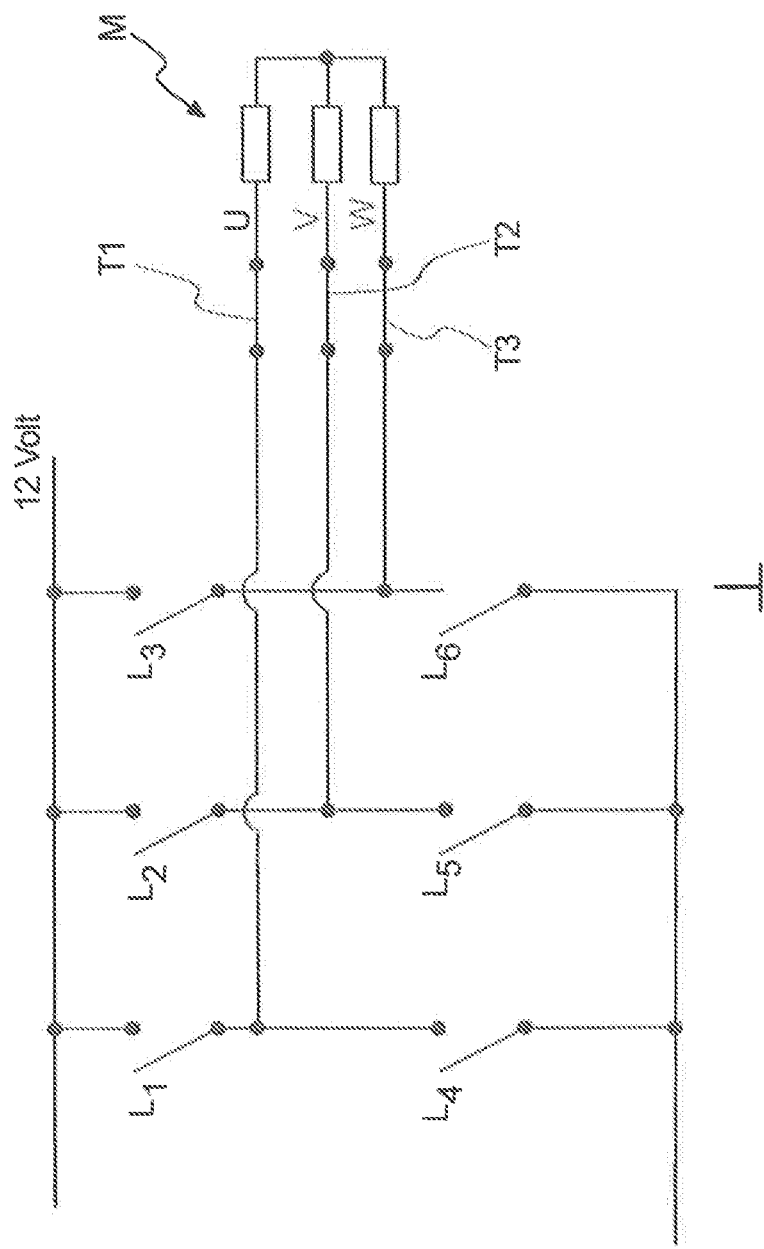
FIG. 1 shows an output stage and a driving motor connected thereto, having three phases U, V, W.

FIG. 1 shows an output stage of a driving motor of a steering assistance system having high-side power switches: L1, L2, L3, low-side power switches: L4, L5, L6, and circuit breakers T1, T2, T3 for the phase separation of the driving motor M. The power switches L1, L2, L3, L4, L5, L6 can be power MOSFETs or IGBTs. The circuit breakers T1, T2, T3 can be designed as field effect transistors or bipolar transistors. If a defect/fault/malfunction occurs, a check is first performed as to whether all high-side power switches L1, L2, L3 and/or all low-side power switches L4, L5, L6 are functional. For example, if all high-side power switches L1, L2, L3 are functional, these are switched off/deactivated/switched to high impedance, and the low-side power switches L4, L5, L6 are controlled in a PWM-like manner or clocked at very high rates, whereby the energy within the driving motor M can be dissipated quickly without causing the driving motor M to be blocked. If all the low-side power switches L4, L5, L6 are functional, all low-side power switches are switched off, and a PWM-like control of the high-side power switches L1, L2, L3 takes place so as to achieve dissipation of the energy of the driving motor M. The method according to the invention results in a gradual, instead of an abrupt, transition from the necessary manual torque in a steering system having steering assistance to a necessary manual torque in a steering system in which the steering assistance system has failed. An otherwise peak-like transition can likewise be prevented, whereby the driving comfort is additionally increased.

Figure 2:
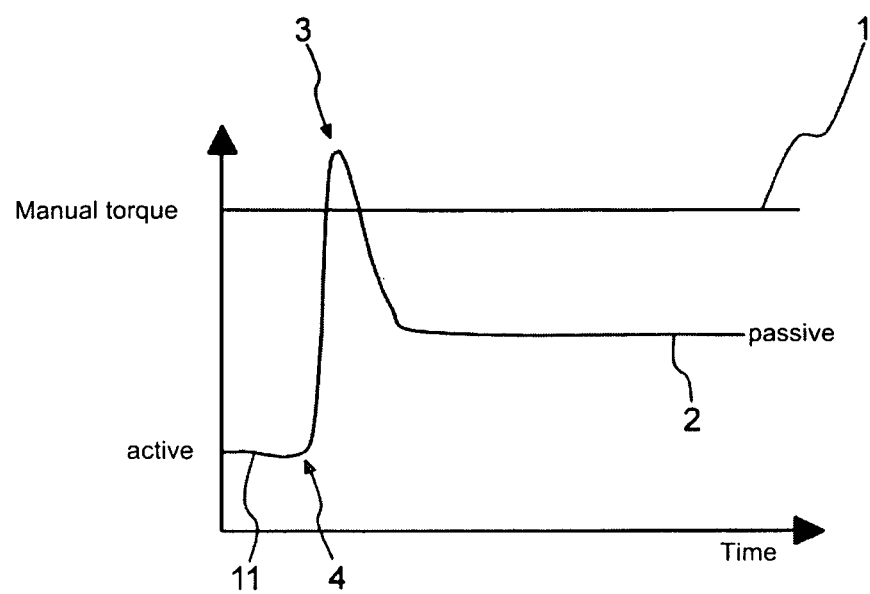
FIG. 2 shows a curve of a manual torque when a defect/fault/malfunction occurs in a steering system according to the prior art.

FIG. 2 shows a transition of the required manual torque at the steering wheel of a vehicle having steering assistance, wherein "active" denotes a manual torque 11 with a functioning steering assistance system and "passive" represents a manual torque 2 with a deactivated steering assistance system. In the steering system according to the prior art, an excess (peak) 3 of the required manual torque results during the transition from the active to the passive range due to the occurrence of a fault 4. At least temporarily, a safety-critical value 1 of the manual torque may thus be achieved or even exceeded.

Figure 3:
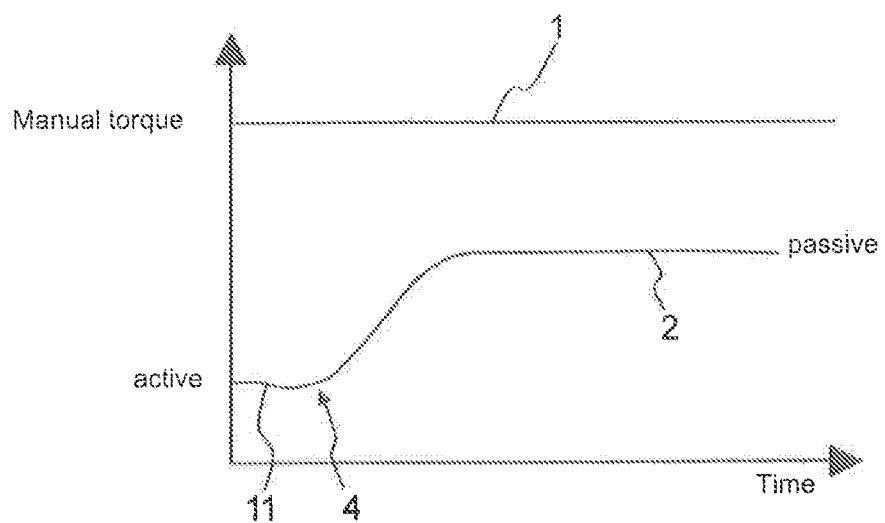
FIG. 3 shows a curve of a manual torque when a defect occurs in a steering system according to the invention.

FIG. 3 shows a transition from a functional steering assistance system to a deactivated steering assistance system of a steering system according to the invention. The transition shows no peaks. Rather, a gradual transition is created, whereby the driving comfort is increased in the event of a malfunction.

Figure 4:
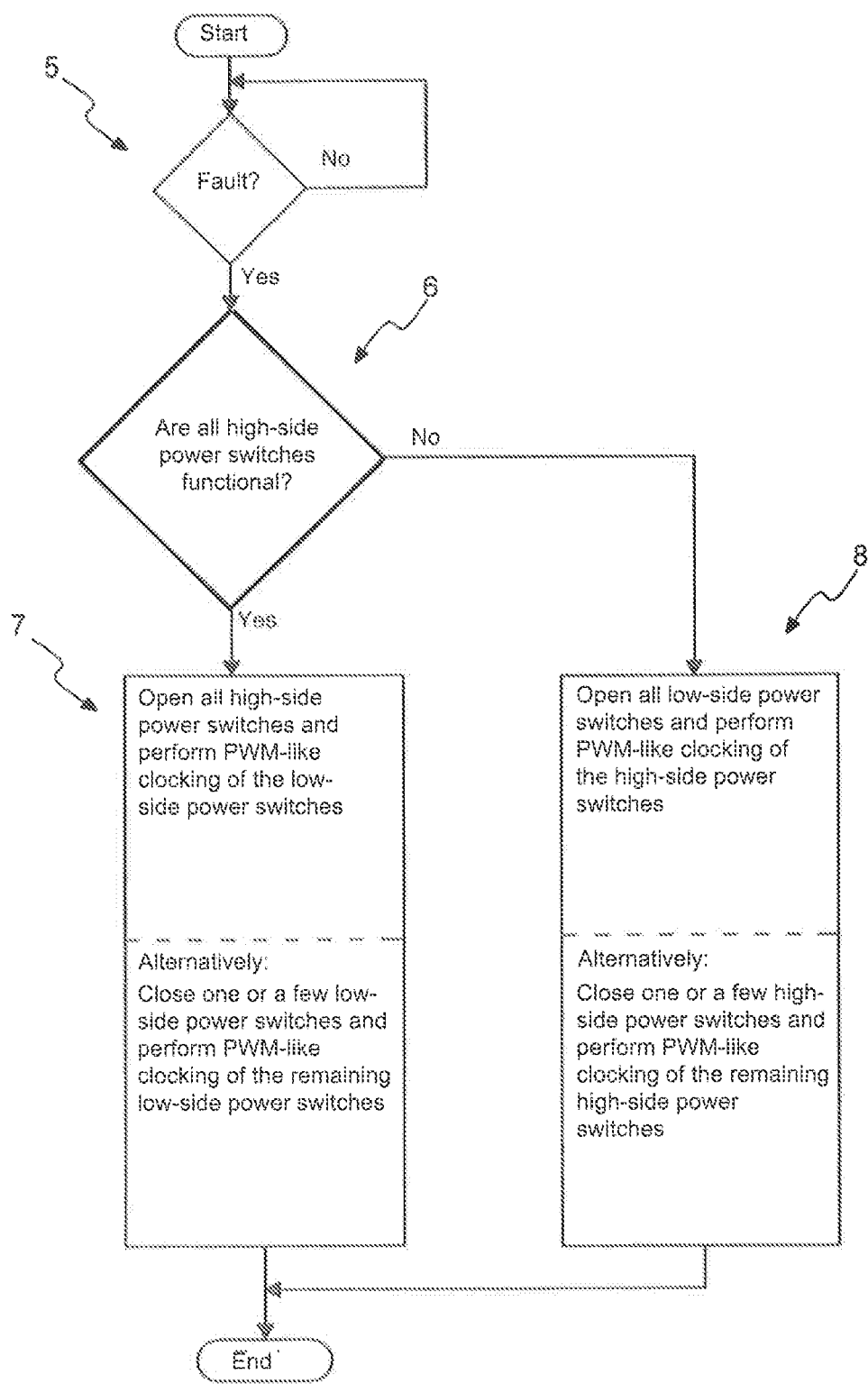
FIG. 4 shows a flow chart of the method according to the invention when a defect occurs in the steering assistance system.

FIG. 4 shows a flow chart of a sequence according to the invention, including polling as to whether a fault is present in the steering system 5, which necessitates a deactivation of the steering assistance system. If so, a check can be performed as to whether all high-side power switches are functional 6. If so, all of these are deactivated, which is to say switched to an "off" state. According to the invention, the low-side power switches are controlled in a PWM-like manner, so that the energy in the driving motor can be dissipated and blocking of the driving motor is prevented 7. This results in a gradual deactivation of the steering assistance system, whereby a smooth transition is achieved from the state with steering assistance (active) into the state without steering assistance (passive). If all low-side power switches are intact, alternatively all low-side power switches may be switched off and the high-side power switches are controlled in a PWM-like manner 8. In one alternative embodiment, not all high-side or low-side power switches are controlled in a PWM-like manner, but all except for one or just a few 7, 8 ("alternative"). The one or few excepted power switches can be permanently/continuously turned on/activated. This results in faster energy dissipation, and an even smoother transition from the active into the passive range.

It shall be noted that the term "comprise" does not exclude additional elements or method steps; likewise, the term "a" or "one" does not exclude multiple elements and steps.

The reference numerals used are provided merely for the sake of better understanding and shall not be considered to be limiting under any circumstances, the claims reflecting the scope of the invention for which protection is sought.

LIST OF REFERENCE NUMERALS 1 critical manual torque
2 manual torque without steering assistance (passive)
3 peak
4 occurrence of a defect/malfunction/fault
5 polling for faults of the steering assistance system yes/no
6 polling if all high-side power switches are functional yes/no
7 process chain of fast clocking of the low-side power switches
8 process chain of fast clocking of the high-side power switches
11 manual torque with steering assistance (active)
L1 high-side power switch
L2 high-side power switch
L3 high-side power switch
L4 low-side power switch
L5 low-side power switch
L6 low-side power switch
T1 circuit breaker U phase
T2 circuit breaker V phase
T3 circuit breaker W phase
M driving motor

The invention claimed is:

1. A method for implementing a peakless transition in required manual torque when transitioning, due to a fault, from a functioning steering assistance system to a deactivated steering assistance system, comprising the following steps:
    establishing the fault of the steering assistance system;
    while occurrence of said fault is established, establishing that all high-side power switches are functional (first case) or establishing that all low-side power switches are functional (second case); and
    while occurrence of said fault is established, dissipating energy from a driving motor of the steering assistance system to achieve a smooth transition without peaks in required manual torque to transition from said functioning steering assistance system to said deactivated steering system by in the first case: opening all high-side power switches and performing PWM-like control of the low-side power switches; or in the second case: opening all low-side power switches and performing PWM-like control of the high-side power switches.

2. The method according to claim 1, wherein, in the first case, not all low-side power switches, and in the second case not all high-side power switches, are controlled in a PWM-like manner, but in each case one or more power switches is continuously turned on.

3. A steering system comprising a control unit for a vehicle, wherein the control unit comprises a memory means having a computer program stored thereon, the computer program being configured to carry out the method according to claim 1.

4. A non-transitory computer-readable storage medium that stores program code means which upon execution by a computer performs the steps for implementing a peakless transition in required manual torque when transitioning, due to a fault, from a functioning steering assistance system to a deactivated steering assistance system, comprising:
    establishing the fault of the steering assistance system;
    while occurrence of said fault is established, establishing that all high-side power switches are functional (first case) or establishing that all low-side power switches are functional (second case); and
    while occurrence of said fault is established, dissipating energy from a driving motor of the steering assistance system to achieve a smooth transition without peaks in required manual torque to transition from said functioning steering assistance system to said deactivated steering system by in the first case: opening all high-side power switches and performing PWM-like control of the low-side power switches; or in the second case: opening all low-side power switches and performing PWM-like control of the high-side power switches.

5. A steering system comprising a control unit for a vehicle, wherein the control unit comprises a memory means having a computer program stored thereon, the computer program being configured to carry out the method according to claim 2.

6. A non-transitory computer-readable storage medium that stores program code means which upon execution by a computer performs the steps for implementing a peakless transition in required manual torque when transitioning, due to a fault, from a functioning steering assistance system to a deactivated steering assistance system, comprising:
  establishing the fault of the steering assistance system;
  while occurrence of said fault is established, establishing that all high-side power switches are functional (first case) or establishing that all low-side power switches are functional (second case); and
  while occurrence of said fault is established, dissipating energy from a driving motor of the steering assistance system to achieve a smooth transition without peaks in required manual torque to transition from said functioning steering assistance system to said deactivated steering system by in the first case: opening all high-side power switches and performing PWM-like control of the low-side power switches; or in the second case: opening all low-side power switches and performing PWM-like control of the high-side power switches; and
  wherein, in the first case, not all low-side power switches, and in the second case not all high-side power switches, are controlled in a PWM-like manner, but in each case one or more power switches is continuously turned on.

\* \* \* \* \*